United States Patent
Guezelarslan

(10) Patent No.: US 11,586,316 B1
(45) Date of Patent: Feb. 21, 2023

(54) TEST SYSTEM AND TESTING METHOD FOR TESTING A DEVICE UNDER TEST

(71) Applicant: Rohde & Schwarz GmbH & Co. KG, Munich (DE)

(72) Inventor: Baris Guezelarslan, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 17/750,656

(22) Filed: May 23, 2022

(51) Int. Cl.
  *G06F 3/041* (2006.01)
(52) U.S. Cl.
  CPC .......... *G06F 3/0412* (2013.01); *G06F 3/0418* (2013.01); *G06F 3/04164* (2019.05)
(58) Field of Classification Search
  None
  See application file for complete search history.

(56) References Cited

U.S. PATENT DOCUMENTS 10,558,207 B1 * 2/2020 McGuirk ........... G05B 23/0283
2019/0384698 A1 * 12/2019 Hung ..................... G06V 10/82

* cited by examiner

*Primary Examiner* — Stephen T. Reed
(74) *Attorney, Agent, or Firm* — Christensen O'Connor Johnson Kindness PLLC

(57) ABSTRACT

A test system for testing a device under test (DUT) with a graphical user interface (GUI) and a touch-sensitive display is described. The test system includes a stimulation layer configured to selectively generate a stimulus signal in at least one area of the touch-sensitive display. The stimulation layer is at least partially transparent. The test system further includes at least one camera configured to capture at least one image of the GUI displayed on the touch-sensitive display through the at least partially transparent stimulation layer. The test system further includes an artificial intelligence (AI) circuit connected with the at least one camera and the stimulation layer. The AI circuit is configured to recognize at least one activatable element of the GUI based on the at least one image captured, and is configured to control the stimulation layer to selectively generate the stimulus signal based on the at least one recognized activatable element, such that a touch and/or or a gesture is imitated. Further a testing method for testing a DUT is described.

20 Claims, 4 Drawing Sheets

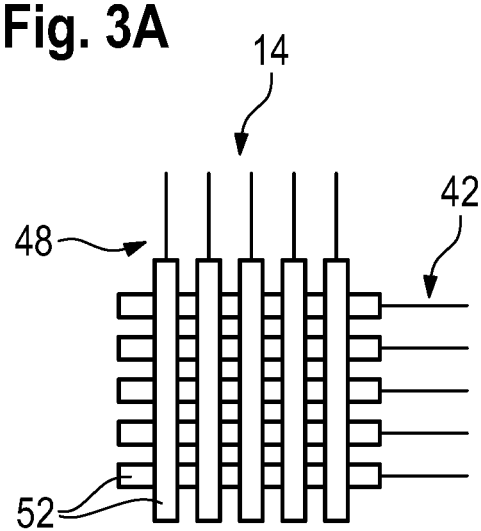
Fig. 3A
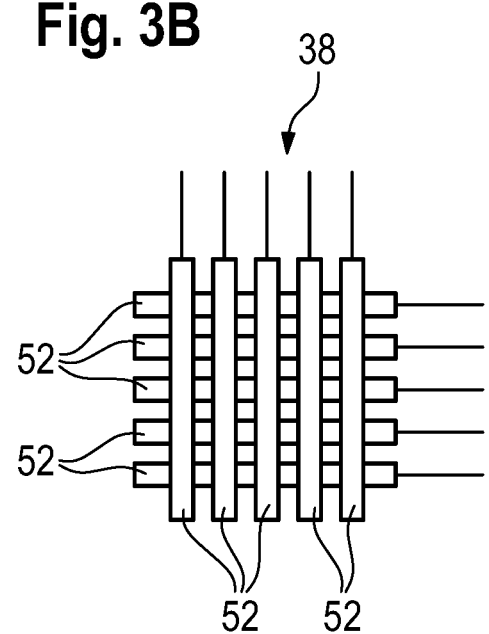
Fig. 3B
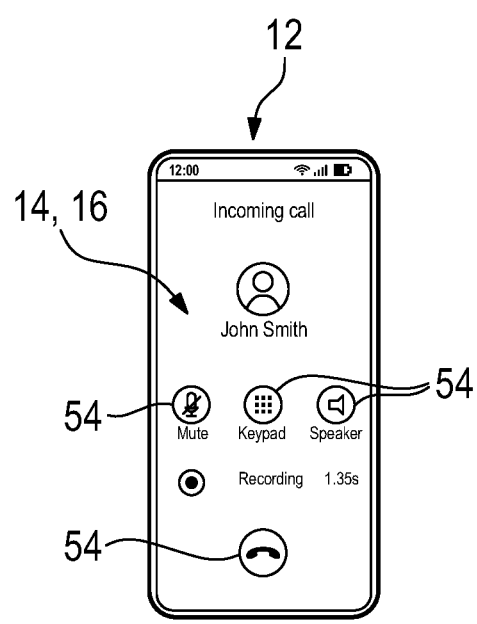
Fig. 4
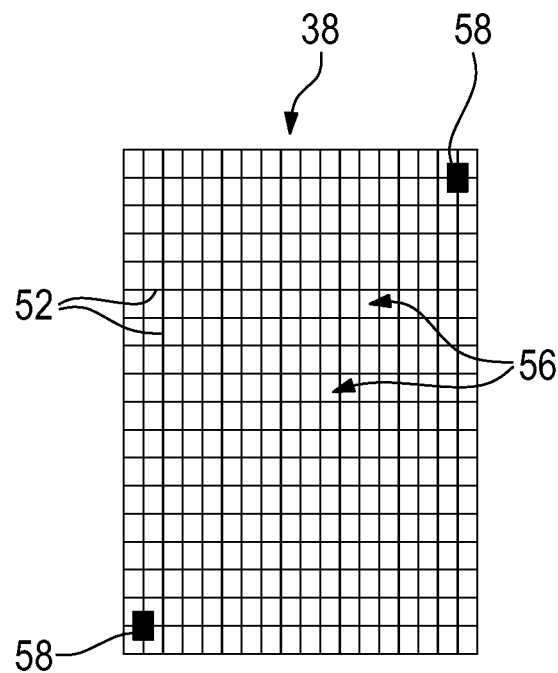

TEST SYSTEM AND TESTING METHOD FOR TESTING A DEVICE UNDER TEST

FIELD OF THE DISCLOSURE

Embodiments of the present disclosure generally relate to a test system for testing a device under test with a graphical user interface and a touch-sensitive display. Embodiments of the present disclosure further relate to a testing method of testing a device under test.

BACKGROUND

Different techniques are known for testing devices under test (DUTs) having a graphical user interface and a touch-sensitive display, for example smartphones or tablets.

For example, the DUT may be connected with a computer, and test commands may be transmitted to the DUT, wherein the test commands correspond to the display of the DUT being touched at a particular point. However, the test commands have to be adapted to match the specifications of the DUT, e.g. the operating system, the size of the display, the resolution of the display, etc., which leads to time-consuming preparations for the tests to be conducted.

As another example, robots or rather robot arms may be used that operate the DUT by touching the display according to a predefined test routine. However, this solution requires considerably more space for performing the tests and is rather costly.

Thus, there is a need for a test system and a testing method that allow for testing a DUT having a graphical user interface and a touch-sensitive display in a more efficient manner.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments of the present disclosure provide a test system for testing a device under test (DUT) with a graphical user interface (GUI) and a touch-sensitive display. In an embodiment, the test system comprises a stimulation layer configured to be attachable to the touch-sensitive display. The stimulation layer is configured to selectively generate a stimulus signal in at least one area of the touch-sensitive display, and the stimulation layer is at least partially transparent. The test system also comprises at least one camera configured to capture at least one image of the GUI displayed on the touch-sensitive display through the at least partially transparent stimulation layer. The test system further comprises an artificial intelligence (AI) circuit connected with the at least one camera and the stimulation layer. The AI circuit is configured to recognize at least one activatable element of the GUI based on the at least one image captured, and is configured to control the stimulation layer to selectively generate the stimulus signal based on the at least one recognized activatable element, such that a touch and/or or a gesture is imitated.

Accordingly, with the test system according to embodiments of the present disclosure, a DUT can be tested by attaching the stimulation layer to the DUT, or more precisely to the touch-sensitive display of the DUT. The AI circuit automatically recognizes activatable elements of the GUI and controls the stimulation layer to selectively activate the activatable elements by imitating a corresponding touch and/or gesture.

Thus, tests that require inputs to the GUI of the DUT can be performed by the test system without the need for a robot arm touching the touch-sensitive display and without the need for customized command signals that are transferred to the DUT from an external device.

For example, the test system may be used for testing different Open System Interconnection (OSI) layers of the DUT by performing inputs on layer 7, i.e. on the application layer. However, it is to be understood that the test system may be used for any other type of test that involves touch-based inputs and/or gesture-based inputs to the GUI of the DUT.

The stimulation layer being at least partially transparent allows for the at least one camera to capture the at least one image of the GUI displayed on the touch-sensitive display.

As the AI circuit automatically recognizes the activatable elements based on the at least one image of the GUI, no previous knowledge about specifications of the DUT, for example about an operating system of the DUT, a display size of the DUT, and/or a resolution of the display of the DUT are required. Moreover, no previous knowledge about the application being executed on the DUT and being displayed via the GUI is necessary.

Thus, a particularly easy to operate test system with reduced special requirements is provided. Moreover, the test system is cost efficient, as there is no need for expensive parts like robot arms.

The stimulation layer may be attached to the DUT, or to the touch-sensitive display of the DUT by any suitable technique. As a first example, the stimulation layer may simply be laid on top of the touch-sensitive display. As another example, the stimulation layer may comprise a friction coating at least on a side that is in contact with the touch-sensitive display, wherein the friction coating enhances the friction between the stimulation layer and the touch-sensitive display. Thus, unwanted relative movements between the stimulation layer and the touch-sensitive display are prevented. In a further example, the test system may comprise holding means that are configured to hold the stimulation layer and/or the DUT in a predefined position, for example in a predefined relative position.

According to an aspect of the present disclosure, the stimulation layer is established, for example, as a foil, as a mesh, or as a plate. Typically, the foil, mesh or plate may have a thickness that is smaller than a thickness of the DUT, for example smaller than half the thickness of the DUT, for example smaller than 25% of the thickness of the DUT. Thus, the space required for testing the DUT is particularly small.

In an embodiment of the present disclosure, the stimulation layer comprises a plurality of stimulation units, wherein the plurality of stimulation units is configured to generate the stimulus signal. The plurality of stimulation units may be distributed over an area being at least the size of the touch-sensitive display, such that the stimulus signal can be applied to any portion of the touch-sensitive display.

In some embodiments, the plurality of stimulation unit is integrated into the foil, into the mesh, or into the plate described above.

While the stimulation units may be optically opaque, areas of the stimulation layer between the stimulation units may be transparent, such that images of the GUI can be captured through the transparent areas between the stimulation units.

The AI circuit may be configured to selectively control the individual stimulation units to generate the stimulus signal, such that different portions of the GUI being associated with different activatable elements can be selectively activated by different stimulation units.

The individual stimulation units may be controlled to generate a respective stimulus signal by applying a current to the respective stimulation unit. In some embodiments, the applied current may be responsible for the stimulus signal, e.g. if the stimulation units include or are established as electrodes or inductors conducting the applied current.

According to another aspect of the present disclosure, the stimulation units are arranged, for example, in a grid. In other words, the stimulation units may be arranged in a grid-shaped pattern. Thus, activatable elements of the GUI can selectively be activated by the stimulation units in a grid-shaped pattern.

The grid may be a uniform grid, such that the stimulation units are equally distributed over the grid. Accordingly, each portion of the GUI can be tested with the same precision.

In some embodiments, the grid covers an area being at least the size of the touch-sensitive display of the DUT. Thus, the stimulus signal can be applied to any portion of the GUI being displayed on the touch-sensitive display.

The stimulation units may include or be established as an electrode and/or as an inductor, respectively. Accordingly, the individual stimulation units may be configured to generate an electric field and/or a magnetic field, for example an electromagnetic field that interacts with the touch-sensitive display, such that a particular portion of the GUI associated with the respective stimulation unit is activated via an imitated touch and/or gesture.

In an embodiment of the present disclosure, the stimulus signal comprises, for example, an electric field and/or a magnetic field. In general, the stimulus signal may comprise an electromagnetic field that interacts with the touch-sensitive display, such that a touch and/or gesture is imitated at a particular portion of the GUI. For instance, the stimulus signal is a current, for example a current having a time-varying amplitude.

In some embodiments, the stimulus signal may comprise an electric field if the touch-sensitive display is established as a capacitive display. Alternatively or additionally, the stimulus signal may comprise a magnetic field if the touch-sensitive display is established as an inductive display.

Another aspect of the present disclosure provides that the stimulation layer comprises, for example, at least one alignment mark. The at least one alignment mark indicates a correct position of the stimulation layer with respect to the touch-sensitive display and/or with respect to the GUI. In general, the at least one alignment mark assists a user in positioning the stimulation layer with respect to the touch-sensitive display and or/with respect to the GUI, such that the user can correctly position the stimulation layer without prior knowledge being necessary.

The at least one alignment mark may be universal, such that the at least one alignment mark indicates the correct position for all types of different DUTs to be tested. Alternatively, the at least one alignment mark may be configured such that it indicates the correct position of the stimulation layer for a particular type of DUT and/or for a particular type of application being executed on the DUT and being displayed on the touch-sensitive display via the GUI.

According to another aspect of the present disclosure, the AI circuit is configured, for example, to recognize a type of the at least one activatable element of the GUI based on the at least one image captured. Accordingly, the AI circuit applies image processing and/or image recognition techniques to the at least one image captured in order to recognize the type of the at least one activatable element of the GUI.

The type of at least one activatable element may relate to a functionality of the respective activatable element.

For example, the functionality of the respective activatable element may be associated with turning the DUT on or off, adjusting an audio volume, scrolling though displayed content, a hyperlink, a drop-down menu, zooming in and out, opening an application, muting or unmuting the DUT, muting or unmuting a microphone, turning loudspeakers of the DUT on or off, initiating a phone call, start or stop recording, etc.

The AI circuit may be configured to determine a position of the at least one activatable element of the GUI based on the at least one image captured. In some embodiments, the AI circuit may determine the position of the at least one activatable element and may selectively activate one or a plurality of stimulation units that is/are associated with the position of the at least one activatable element, such that the touch and/or gesture is correctly imitated in an area of the touch-sensitive display actually displaying the activatable element.

In other words, a correct alignment between the activatable element and the generated stimulus signal is ensured.

In an embodiment of the present disclosure, the AI circuit comprises a machine-learning sub-circuit, wherein the machine-learning sub-circuit is pre-trained to recognize the at least one activatable element of the GUI based on the at least one image captured.

For example, the machine-learning sub-circuit may be pre-trained with a data base comprising images of GUIs associated with a plurality of different types of DUTs, different operating systems, and/or different applications being executed on the respective DUT.

Optionally, the data base may further comprise test routines associated with the plurality of different types of DUTs, different operating systems, and/or different applications being executed on the respective DUT, wherein the test routines comprise information which activatable elements need to be activated in order to test certain aspects of the performance of the DUT.

Thus, the machine-learning sub-circuit is pre-trained to automatically conduct tests on a large variety of different types of DUTs, different operating systems, and/or different applications being executed on the respective DUT.

In some embodiments, it has turned out that the AI circuit can even correctly perform tests on DUTs, operating systems and/or applications that is has not been explicitly trained for.

Any suitable machine-learning technique may be used in order to pre-train the machine-learning sub-circuit to recognize the at least one activatable element of the GUI based on the at least one image captured.

The machine-learning sub-circuit may comprise an artificial neural network (ANN), wherein the ANN is pre-trained to recognize the at least one activatable element of the GUI based on the at least one image captured. For example, the ANN may be a convolutional neural network, as this type of ANNs is particularly suitable for processing and recognizing images.

However, it is to be understood that any other suitable type of ANNs may be used.

According to an aspect of the present disclosure, the AI circuit comprises, for example, a control sub-circuit, wherein the control sub-circuit is configured to control the stimulation layer such that the stimulus signal is aligned with the at least one activatable element of the GUI. Thus, it is ensured that the touch and/or gesture is imitated at the correct portion of the touch-sensitive display, namely the portion actually displaying the at least one activatable element.

In an embodiment of the present disclosure, the AI circuit is configured to control the stimulation layer according to a predefined test routine. In general, the predefined test routine corresponds to an order in which different activatable elements need to be activated in order to test certain aspects of the performance of the DUT. In other words, the predefined test routine corresponds to a series of touches and/or gestures that are imitated on different portions of the touch-sensitive display or on the same portion of the touch-sensitive display.

Thus, the test system according to the present disclosure may be configured to perform a series of tests by imitating touches and/or gestures fully automatically.

In a further embodiment of the present disclosure, the test system comprises a measurement chamber that includes a DUT holder for holding the DUT, a connection interface or connecting means for connecting the stimulation layer to the AI circuit, and the at least one camera. Within the measurement chamber, the DUT can be tested without perturbations from the environment. For example, the measurement chamber shields the interior from electromagnetic waves, such that electromagnetic measurements can be conducted undisturbed. In other words, the measurement chamber may be a shielded chamber.

The DUT holder may be configured to hold the DUT in a predefined position for performing the tests. In some embodiments, the DUT holder is configured to adapt the position of the DUT. Alternatively or additionally, the test system may comprise holding means for holding the stimulation layer in a predefined position, for example in a predefined position relative to the DUT or rather relative to the touch-sensitive display of the DUT.

The connection interface, such as the connecting means, may comprise suitable cables, connectors, shielded connectors, or any other type of electric circuitry.

Embodiments of the present disclosure further provide a testing method of testing a device under test (DUT). In an embodiment, the testing method comprises the following steps:

providing the DUT, wherein the DUT comprises a graphical user interface (GUI) and a touch-sensitive display;

providing a stimulation layer, wherein the stimulation layer is configured to selectively generate a stimulus signal in at least one area of the stimulation layer, wherein the stimulation layer is at least partially transparent;

attaching the stimulation layer to the touch-sensitive display;

capturing, by at least one camera, at least one image of the GUI displayed on the touch-sensitive display through the at least partially transparent stimulation layer;

recognizing, by an artificial intelligence (AI) circuit, at least one activatable element of the GUI based on the at least one image captured; and controlling, by the AI circuit, the stimulation layer to selectively generate the stimulus signal based on the at least one recognized activatable element, such that a touch and/or or a gesture is imitated on the touch-sensitive display.

In some embodiments, embodiments of the test system described above are configured to perform the testing method at least partially. For example, any of the test systems described above may be configured to perform at least the following steps:

capturing, by at least one camera, at least one image of the GUI displayed on the touch-sensitive display through the at least partially transparent stimulation layer;

recognizing, by an artificial intelligence (AI) circuit, at least one activatable element of the GUI based on the at least one image captured; and controlling, by the AI circuit, the stimulation layer to selectively generate the stimulus signal based on the at least one recognized activatable element, such that a touch and/or or a gesture is imitated on the touch-sensitive display.

Regarding the further advantages and properties of the testing method(s), reference is made to the explanations given above with respect to the test system(s), which also hold for the testing method and vice versa.

In some embodiments, the stimulation layer may be controlled according to a predefined test routine. In general, the predefined test routine corresponds to an order in which different activatable elements need to be activated in order to test certain aspects of the performance of the DUT. In other words, the predefined test routine corresponds to a series of touches and/or gestures that are imitated on different portions of the touch-sensitive display or on the same portion of the touch-sensitive display. Thus, a series of tests may be performed by imitating touches and/or gestures fully automatically.

According to an aspect of the present disclosure, the stimulation layer comprises, for example, a plurality of stimulation units. The plurality of stimulation units may be controlled individually to generate the stimulus signal. Thus, different portions of the GUI being associated with different activatable elements can be selectively activated by different stimulation units of the plurality of stimulation units.

The plurality of stimulation units may be distributed over an area being at least the size of the touch-sensitive display, such that the stimulus signal can be applied to any portion of the touch-sensitive display.

According to another aspect of the present disclosure, a type of the at least one activatable element of the GUI, for example, is recognized and/or a position of the at least one activatable element of the GUI is determined by the AI circuit.

In some embodiments, the AI circuit applies image processing and/or image recognition techniques to the at least one image captured in order to recognize the type of the at least one activatable element of the GUI and/or in order to determine the position of the at least one activatable element.

The type of at least one activatable element may relate to a functionality of the respective activatable element. For example, the functionality of the respective activatable element may be associated with turning the DUT on or off, adjusting an audio volume, scrolling though displayed content, activating a hyperlink, a drop-down menu, zooming in and out, opening an application, muting or unmuting the DUT, muting or unmuting a microphone of the DUT, turning loudspeakers of the DUT on or off, initiating a phone call, start or stop recording, etc.

The stimulation layer may be controlled to generate the stimulus signal based on the recognized type and/or based on the determined position.

Thus, the AI circuit may recognize the at least one activatable element. Further, the AI circuit may selectively activate one or a plurality of stimulation units that is/are associated with the at least one activatable element, such that an appropriate touch and/or gesture imitated for the type of the activatable element.

Alternatively or additionally, the AI circuit may determine the position of the at least one activatable element and may selectively activate one or a plurality of stimulation units that is/are associated with the position of the at least one activatable element, such that the touch and/or gesture is correctly imitated in an area of the touch-sensitive display actually displaying the activatable element.

In an embodiment of the present disclosure, the stimulation layer is controlled such that the generated stimulus signal is aligned with the at least one activatable element of the GUI. Thus, it is ensured that the touch and/or gesture is imitated at the correct portion of the touch-sensitive display, namely the portion actually displaying the at least one activatable element.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 3A schematically shows electrodes in a touch-sensitive display of the device under test and FIG. 3B schematically shows stimulation units of the stimulation layer;

FIG. 4 schematically shows a top view of the device under test and of the stimulation layer;

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps. As such, one of ordinary skill will appreciate that any such examples are within the scope of the claimed embodiments.

Figure 1:
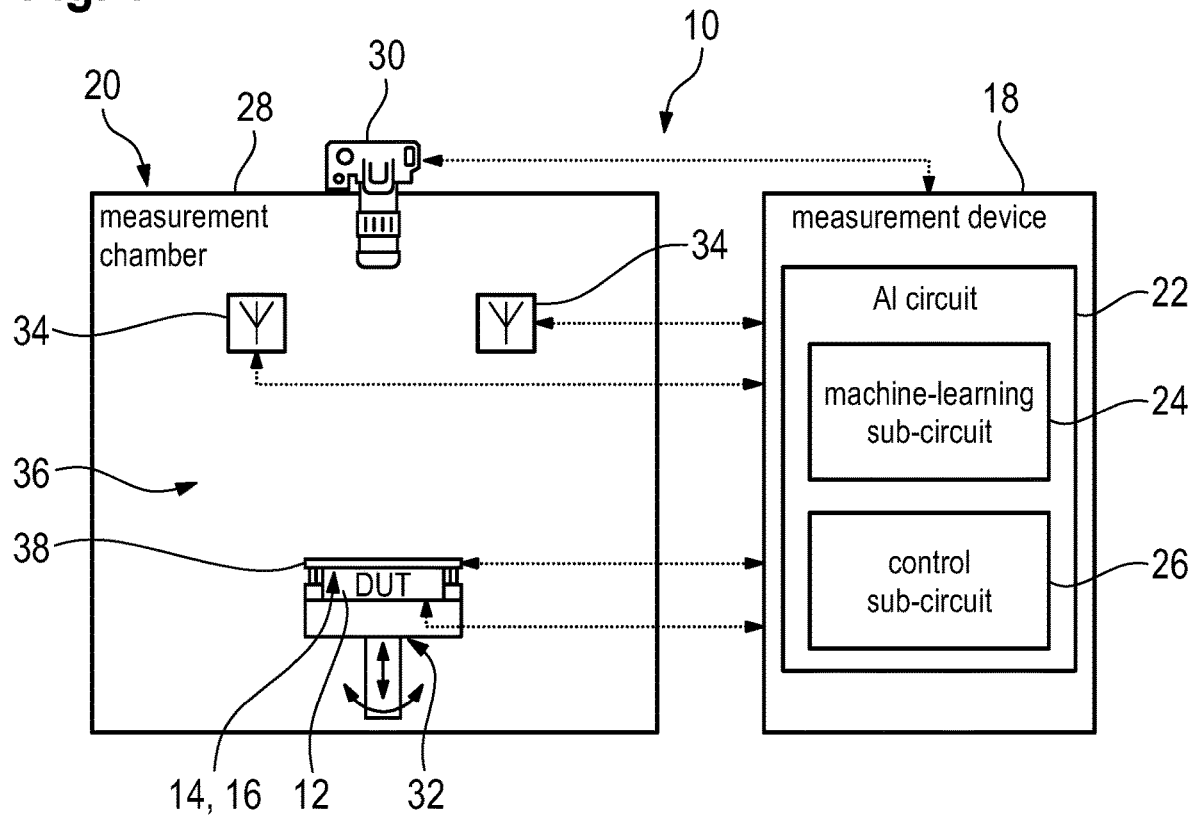
FIG. 1 schematically shows a test system according to an embodiment of the present disclosure.

FIG. 1 schematically shows an example embodiment of a test system 10 that is configured to conduct tests on a device under test (DUT) 12. In general, the DUT 12 may be any electronic device that has a touch-sensitive display 14 and a graphical user interface (GUI) 16 being displayed on the touch-sensitive display 14. Further, the DUT 12 may be configured to communicate wirelessly with other electronic devices, e.g. via WLAN, 4G or 5G. In some embodiments, the DUT 12 may be a smartphone or a tablet.

As shown in FIG. 1, the test system 10 comprises a measurement device 18 and a measurement chamber 20. The measurement device 18 may be any suitable electronic device is configured to have the functionality described hereinafter. For example, the measurement device 18 may be a personal computer, a laptop, a notebook, a tablet, or a smartphone.

The measurement device 18 comprises an AI circuit 22, which comprises a machine-learning sub-circuit 24 and a control sub-circuit 26. Therein and in the following, the terms "circuit" and "sub-circuit" are understood to describe suitable hardware, suitable software, or a combination of hardware and software that is configured to have a certain functionality. The hardware may, inter alia, comprise, for example, a CPU, a GPU, an FPGA, an ASIC, or other types of electronic circuitry.

In the embodiment of FIG. 1, the measurement chamber 20 comprises a housing 28, a camera 30, and a DUT holder 32. Optionally, the measurement chamber 20 may comprise at least one radio frequency (RF) antenna 34, for example a plurality of RF antennas 34.

The housing 28 is, for example, a closed housing that encloses an interior space 36 of the measurement chamber 20, wherein the DUT holder 32 and the optional RF antenna(s) 34 are provided within the interior space 36 confined by the housing 28. In general, the housing 28 screens the interior space from external electromagnetic waves, such that tests can be conducted on the DUT 12 within the interior space without external perturbations.

Optionally, the measurement chamber 20 may be established as an anechoic chamber, i.e. an inner wall of the housing 28 may be provided with absorbers that are configured to absorb electromagnetic waves, thereby significantly reducing reflections within the measurement chamber 20.

In general, the camera 30 is configured to capture images of the DUT 12. The camera 30 may be partially or completely provided in the interior space 36 of the measurement chamber 20.

The DUT holder 32 is configured to hold the DUT 12 in a predetermined position within the interior space 36, namely such that images of the DUT 12 can be captured by the camera 30. The DUT holder 32 may further be configured to adjust the position of the DUT 12, namely by moving the DUT 12 and/or by rotating the DUT 12.

The test system 10 further comprises a stimulation layer 38 that is attachable to the touch-sensitive display 14 of the DUT 12. In the example embodiment shown in FIG. 1, the DUT holder 32 is configured to hold the stimulation layer 38 in a predefined position with respect to the DUT 12 or with respect to the touch-sensitive display 14. In other words, the DUT holder 32 comprises holding means for holding the stimulation layer 38 in the predefined position. In an embodiment, the holding means may include a mount, brackets, support surface(s), etc., for holding the stimulation layer 38.

However, it is also conceivable that the holding means for holding the stimulation layer 38 in the predefined position may be established separately from the DUT holder 32. Further, it is also conceivable that no such holding means are provided for the stimulation layer 38 at all.

The camera 30 and the stimulation layer 38 are connected with the AI circuit 22 in a signal-transmitting manner Therein and in the following, the term "connected in a signal transmitting manner" is understood to denote a cable-based or wireless connection that is configured to transmit signals between the respective devices or components.

Accordingly, a suitable connecting means, such as a connection interface, may be provided that connects the camera 30 and/or the stimulation layer 38 with the AI circuit 22. The connecting means may comprise suitable cables, connectors, shielded connectors, or any other type of electric circuitry.

Optionally, the DUT 12 and/or the RF antenna(s) 34 may be connected with the measurement device 18 in a signal-transmitting manner.

Figure 2:
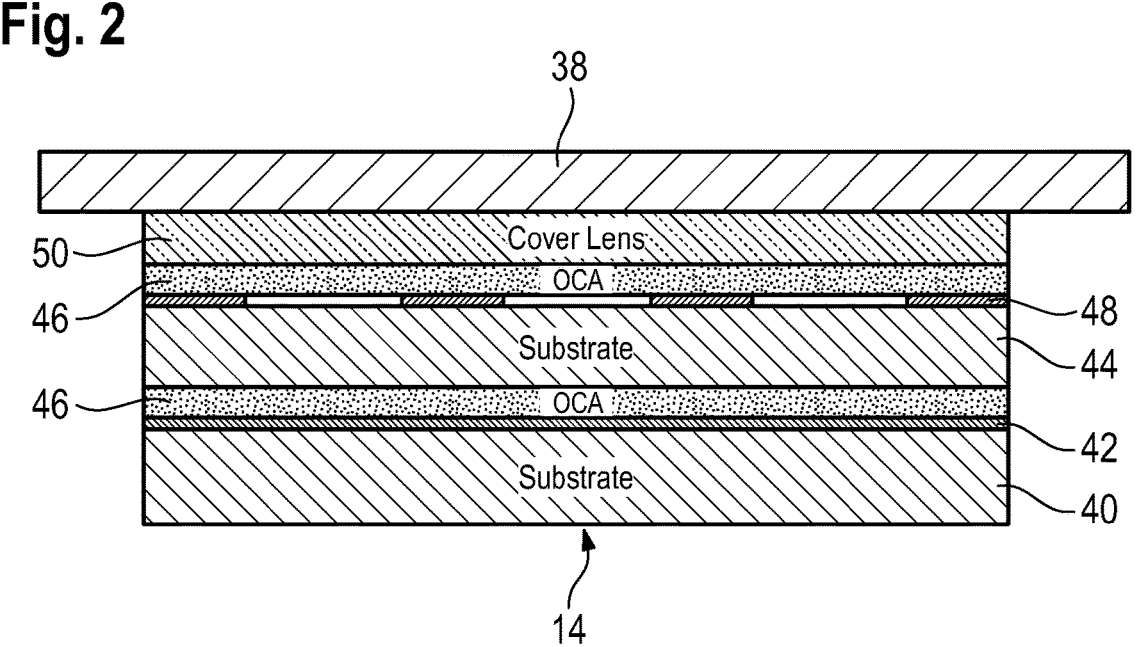
FIG. 2 schematically shows a side view of a device under test and of a stimulation layer of the test system of FIG. 1.

FIG. 2 shows a cross-section of an example embodiment of the touch-sensitive display 14 and of the stimulation layer 38. In the embodiment shown in FIG. 2, the touch-sensitive display 14 comprises a first substrate 40 forming the basis of the touch-sensitive display 14.

A first electrode layer 42 is provided on top of the first substrate 40. The touch-sensitive display 14 further comprises a second substrate 44 that is attached to the first electrode layer 42 by an optical clear adhesive (OCA) layer 46. A second electrode layer 48 is provided on top of the second substrate 44.

The touch-sensitive display 14 further comprises a cover lens 50 that is attached to the second electrode layer 48 by a further optical clear adhesive (OCA) layer 46. The cover lens 50 is the part of the touch-sensitive display 14 being touched by a user in order to control the DUT 12.

As is shown in FIGS. 1 and 2, the stimulation layer 38 may have a base area that is larger than the base area of the touch-sensitive display 14, such that the stimulation layer 38 fully covers the touch-sensitive display 14. Further, the stimulation layer may have a thickness that is smaller than a thickness of the DUT 12 or of the touch-sensitive display 14, for example smaller than half the thickness of the thickness of the DUT 12 or of the touch-sensitive display 14, for example smaller than 25% of the thickness of the thickness of the DUT 12 or of the touch-sensitive display 14.

FIG. 3A schematically shows a top view of the first electrode layer 42 and of the second electrode layer 48. In this embodiment, the first electrode layer 42 and the second electrode layer 48 each comprise a plurality of electrodes 52, wherein the electrodes 52 of the first electrode layer 42 extend perpendicular to the electrodes 52 of the second electrode layer 48.

FIG. 3B schematically shows an example embodiment of the stimulation layer 38. The stimulation layer 38 may comprise a plurality of stimulation units 52 that are arranged in a grid-shaped pattern, wherein the individual stimulation units 52 are established as electrodes being configured to conduct a current. The stimulation units 52 establish a mesh. Optionally, the mesh may be integrated into a transparent foil or plate forming the stimulation layer 38. It is to be understood that FIG. 3B shows only an embodiment of the stimulation layer 38.

In some embodiments, the stimulation layer may be established as a foil, as a mesh, or as a plate being at least partially optically transparent.

The stimulation units 52 may be established as an electrode and/or as an inductor, respectively. Accordingly, the individual stimulation units 52 are configured to generate an electric field and/or a magnetic field, for example an electromagnetic field that interacts with the touch-sensitive display 14, as is described in more detail below.

FIG. 4 shows a top view of the DUT 12 and of the stimulation layer 38 in a disassembled state, i.e. with the stimulation layer 38 not being attached to the touch-sensitive display 14 and the display rendering a GUI 16. The GUI 16 comprises a plurality of different types of activatable elements 54 having different functionalities.

For example, the functionality of the respective activatable element may be associated with turning the DUT 12 on or off, adjusting an audio volume, scrolling though displayed content, activating a hyperlink, opening a drop-down menu, zooming in and out, opening an application, muting or unmuting the DUT 12, muting or unmuting a microphone of the DUT 12, turning loudspeakers of the DUT 12 on or off, initiating a phone call, start or stop recording, etc.

As is shown in FIG. 4, the stimulation units 52 may be optically opaque. However, areas 56 of the stimulation layer 38 between the stimulation units 52 may be transparent, such that images of the GUI 16 can be captured through the transparent areas 56 between the stimulation units 52.

Optionally, the stimulation layer 38 may comprise alignment marks 58, wherein the alignment marks 58 indicate a correct position of the stimulation layer 38 with respect to the touch-sensitive display 14 and/or with respect to the GUI 16.

Thus, the alignment marks 58 assists a user in positioning the stimulation layer 38 with respect to the touch-sensitive display 14 and or/with respect to the GUI 16.

Figure 5:
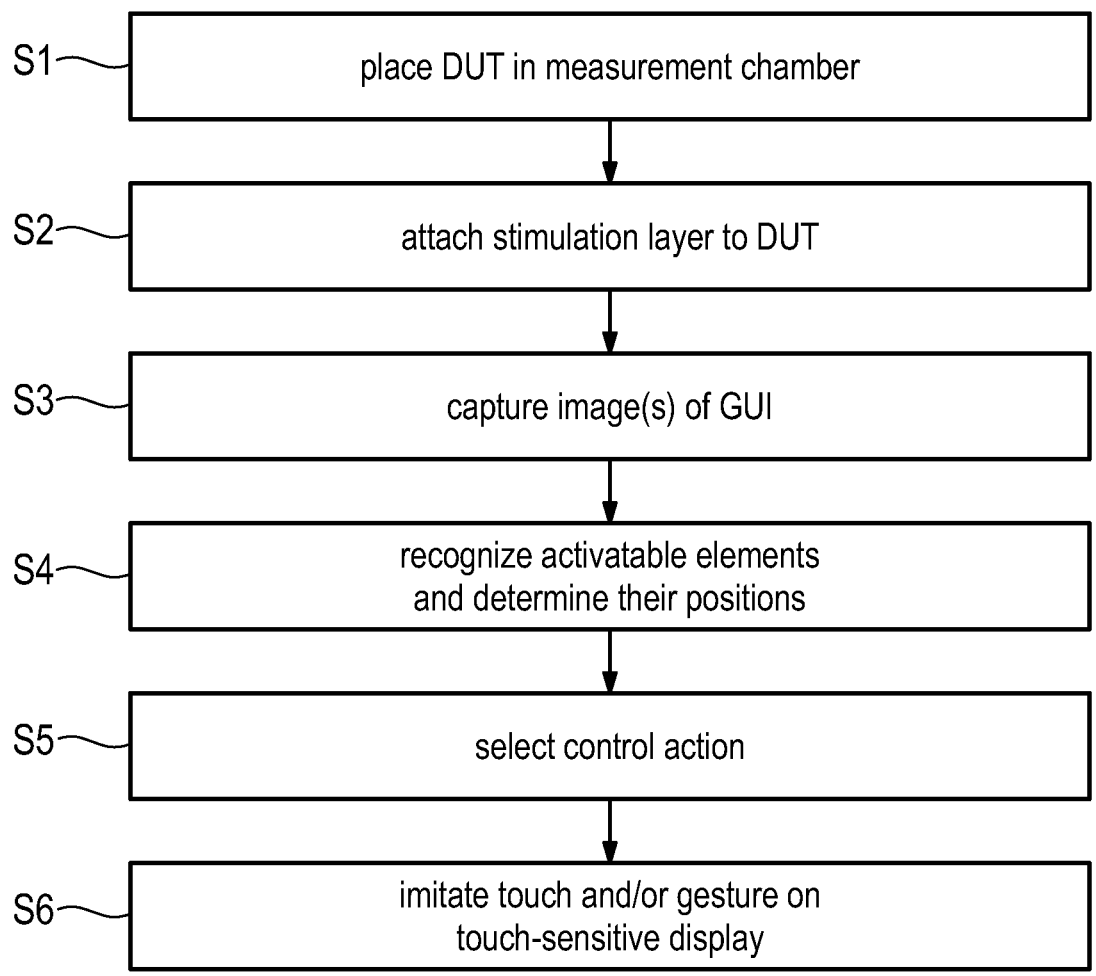
FIG. 5 shows a flow chart of a testing method according to an embodiment of the present disclosure.

The test system 10 can be used for performing a testing method of testing the DUT 12, an example of which is described in the following with reference to FIG. 5.

The device under test 12 is provided and placed in the interior space 36 of the measurement chamber 20 at a predefined test position (step S1).

The stimulation layer 38 is provided and attached to the touch-sensitive display 14 (step S2).

At least one image of the GUI 16 displayed on the touch-sensitive display 14 is captured through the at least partially transparent stimulation layer 38 (step S3).

The captured image(s) are forwarded to the AI circuit 22, or more precisely to the machine-learning sub-circuit 24.

The activatable elements 54 are recognized and positions of the activatable elements 54 are determined by the machine-learning sub-circuit 24 (step S4).

In general, the machine-learning sub-circuit 24 is pre-trained to recognize the at least one activatable element of the GUI 16 based on the at least one image captured. The machine-learning sub-circuit 24 may comprise an artificial neural network (ANN), wherein the ANN is pre-trained to recognize the at least one activatable element of the GUI 16 based on the at least one image captured. For example, the ANN may be a convolutional neural network.

For example, the machine-learning sub-circuit 24 may be pre-trained with a data base comprising images of GUIs associated with a plurality of different types of DUTs, different operating systems, and/or different applications being executed on the respective DUT.

Optionally, the data base may further comprise test routines associated with the plurality of different types of DUTs, different operating systems, and/or different applications being executed on the respective DUT, wherein the test routines comprise information which activatable elements need to be activated in order to test certain aspects of the performance of the respective DUT.

Any suitable machine-learning technique may be used in order to pre-train the machine-learning sub-circuit 24 to recognize the at least one activatable element of the GUI 16 based on the at least one image captured.

Figure 6:
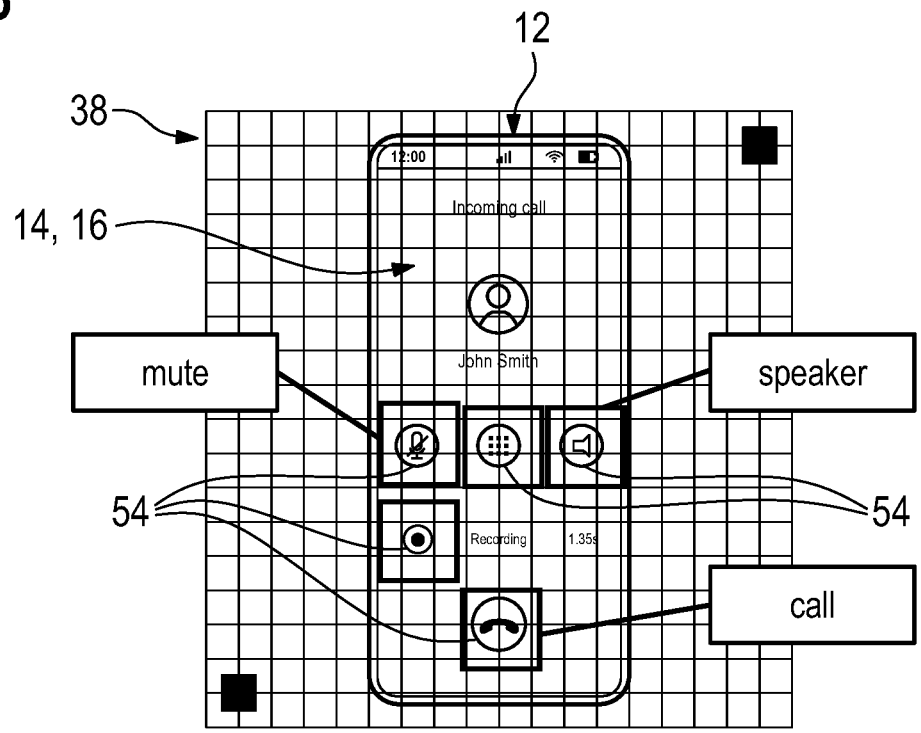
FIG. 6 shows an illustration of a step of the testing method of FIG. 5.

As is illustrated in FIG. 6, the machine-learning sub-circuit 24 may recognize the type of the respective activatable element 54, i.e. the functionality associated with the respective activatable element 54.

A control action is selected by the machine-learning sub-circuit 24, wherein the control action corresponds to an input to be applied to the GUI 16 (step S5).

Figure 7:
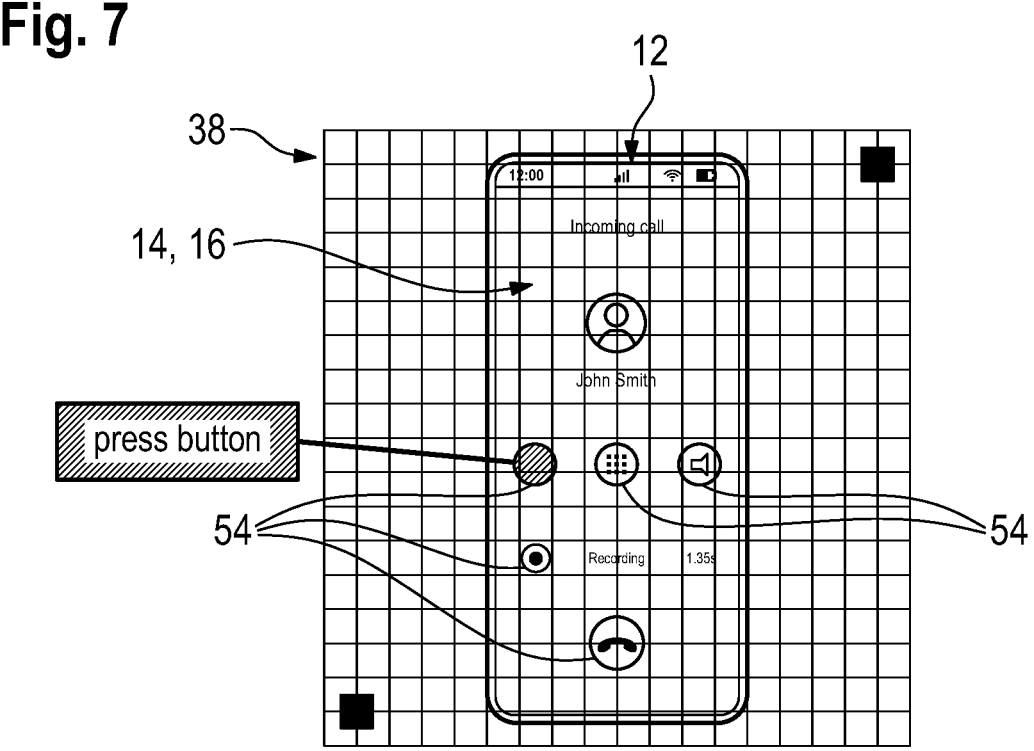
FIG. 7 shows an illustration of a step of the testing method of FIG. 5.

As is illustrated in FIG. 7, the control action may correspond to pressing one of the activatable elements. However, it is to be understood that the control action may correspond to an arbitrary combination of inputs that are associated with touches and/or gestures applied to the touch-sensitive display 14.

The control action may be selected based on a predefined test routine, wherein the predefined test routine corresponds to an order in which different activatable elements 54 need to be activated in order to test certain aspects of the performance of the DUT 12. In other words, the predefined test routine corresponds to a series of touches and/or gestures that are imitated on different portions of the touch-sensitive display 14 or on the same portion of the touch-sensitive display 14.

A stimulation signal is generated based on the selected control action, such that a touch and/or or a gesture is imitated on the touch-sensitive display 14 by the stimulation layer 38 (step S6). In some embodiments, the stimulation units 52 are selectively controlled by the control sub-circuit 26 to generate an electric field and/or magnetic field, for example an electromagnetic field, which interacts with the touch-sensitive display so as to imitate the touch and/or gesture that is properly aligned with the activatable elements 54.

For example, the control sub-circuit 26 may selectively apply currents to particular stimulation units 52 such that the stimulus signal is generated. In some embodiments, the applied currents may be responsible for the stimulus signal, e.g. if the stimulation units 52 are established as electrodes or inductors conducting the applied currents.

The test system 10 described above may be used for conducting different types of tests on the DUT 12. In some embodiments, the test system 10 described above may be used for testing different Open System Interconnection (OSI) layers of the DUT 12 by performing inputs on layer 7, i.e. on the application layer. Accordingly, a reaction of the DUT 12 to the imitated touches and/or gestures may be evaluated based on further images captured by the camera 30 and/or by a direct data connection of the DUT 12 to the measurement device 18.

As another example, the test system may be used to conduct over-the-air (OTA) testing of the DUT 12 via the RF antenna(s) 34, wherein the DUT 12 is controlled to enter certain operational states as described above. In this case, the test system 10 may be configured to automatically attach the stimulation layer 38 to the touch-sensitive display 14 for controlling the DUT, and to automatically detach the stimulation layer 38 for subsequent RF OTA tests.

Certain embodiments disclosed herein utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

Various embodiments of the present disclosure or the functionality thereof may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably). Such non-transitory computer-readable storage media include all computer-readable media (including volatile and non-volatile media).

Embodiments of the present disclosure may also take the form of an apparatus, system, computing device, computing entity, and/or the like executing instructions stored on computer-readable storage media to perform certain steps or operations. The computer-readable media include cooperating or interconnected computer-readable media, which exist exclusively on a processing or processor system or distributed among multiple interconnected processing or processor systems that may be local to, or remote from, the processing or processor system. However, embodiments of the present disclosure may also take the form of an entirely hardware embodiment performing certain steps or operations.

Various embodiments are described above with reference to block diagrams and/or flowchart illustrations of apparatuses, methods, systems, and/or computer program instructions or program products. It should be understood that each block of any of the block diagrams and/or flowchart illustrations, respectively, or portions thereof, may be implemented in part by computer program instructions, e.g., as logical steps or operations executing on one or more computing devices. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein.

These computer program instructions may also be stored in one or more computer-readable memory or portions thereof, such as the computer-readable storage media described above, that can direct one or more computers or computing devices or other programmable data processing apparatus(es) to function in a particular manner, such that the instructions stored in the computer-readable memory produce an article of manufacture including computer-readable instructions for implementing the functionality specified in the flowchart block or blocks.

The computer program instructions may also be loaded onto one or more computers or computing devices or other programmable data processing apparatus(es) to cause a series of operational steps to be performed on the one or more computers or computing devices or other programmable data processing apparatus(es) to produce a computer-implemented process such that the instructions that execute on the one or more computers or computing devices or other programmable data processing apparatus(es) provide operations for implementing the functions specified in the flowchart block or blocks and/or carry out the methods described herein It will be appreciated that the term computer or computing device can include, for example, any computing device or processing structure, including but not limited to a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A test system for testing a device under test (DUT) with a graphical user interface (GUI) and a touch-sensitive display, the test system comprising
a stimulation layer attachable to the touch-sensitive display, wherein the stimulation layer is configured to selectively generate a stimulus signal in at least one area of the touch-sensitive display, the stimulation layer being at least partially transparent;
at least one camera configured to capture at least one image of the GUI displayed on the touch-sensitive display through the at least partially transparent stimulation layer; and
an artificial intelligence (AI) circuit connected with the at least one camera and the stimulation layer, wherein the AI circuit is configured to recognize at least one activatable element of the GUI based on the at least one image captured, and is configured to control the stimulation layer to selectively generate the stimulus signal based on the at least one recognized activatable element, such that a touch and/or or a gesture is imitated.

2. The test system of claim 1, wherein the stimulation layer is established as a foil, as a mesh, or as a plate.

3. The test system of claim 1, wherein the stimulation layer comprises a plurality of stimulation units, wherein the plurality of stimulation units is configured to generate the stimulus signal.

4. The test system of claim 3, wherein the stimulation units are arranged in a grid.

5. The test system of claim 3, wherein the stimulation units are established as an electrode and/or as an inductor, respectively.

6. The test system of claim 1, wherein the stimulus signal comprises an electric field and/or a magnetic field.

7. The test system of claim 1, wherein the stimulation layer comprises at least one alignment mark that indicates a correct position of the stimulation layer with respect to the touch-sensitive display and/or with respect to the GUI.

8. The test system of claim 1, wherein the AI circuit is configured to recognize a type of the at least one activatable element of the GUI based on the at least one image captured.

9. The test system of claim 1, wherein the AI circuit is configured to determine a position of the at least one activatable element of the GUI based on the at least one image captured.

10. The test system of claim 1, wherein the AI circuit comprises a machine-learning sub-circuit, wherein the machine-learning sub-circuit is pre-trained to recognize the at least one activatable element of the GUI based on the at least one image captured.

11. The test system of claim 10, wherein the machine-learning sub-circuit comprises an artificial neural network (ANN), wherein the ANN is pre-trained to recognize the at least one activatable element of the GUI based on the at least one image captured.

12. The test system of claim 1, wherein the AI circuit comprises a control sub-circuit, wherein the control sub-circuit is configured to control the stimulation layer such that the stimulus signal is aligned with the at least one activatable element of the GUI.

13. The test system of claim 12, wherein the AI circuit is configured to control the stimulation layer according to a predefined test routine.

14. The test system of claim 1, wherein the test system comprises a measurement chamber, wherein the measurement chamber comprises a DUT holder for holding the DUT, a connection interface for connecting the stimulation layer to the AI circuit, and the at least one camera.

15. A testing method of testing a device under test (DUT), the testing method comprising the steps of
providing the DUT, wherein the DUT comprises a graphical user interface (GUI) and a touch-sensitive display;
providing a stimulation layer, wherein the stimulation layer is configured to selectively generate a stimulus signal in at least one area of the stimulation layer, wherein the stimulation layer is at least partially transparent;
attaching the stimulation layer to the touch-sensitive display;
capturing, by at least one camera, at least one image of the GUI displayed on the touch-sensitive display through the at least partially transparent stimulation layer;
recognizing, by an artificial intelligence (AI) circuit, at least one activatable element of the GUI based on the at least one image captured; and
controlling, by the AI circuit, the stimulation layer to selectively generate the stimulus signal based on the at least one recognized activatable element, such that a touch and/or or a gesture is imitated on the touch-sensitive display.

16. The testing method of claim 15, wherein the stimulation layer is controlled according to a predefined test routine.

17. The testing method of claim 15, wherein the stimulation layer comprises a plurality of stimulation units, wherein the plurality of stimulation units is controlled individually to generate the stimulus signal.

18. The testing method of claim 15, wherein a type of the at least one activatable element of the GUI is recognized and/or a position of the at least one activatable element of the GUI is determined by the AI circuit.

19. The testing method of claim 18, wherein the stimulation layer is controlled to generate the stimulus signal based on the recognized type and/or based on the determined position.

20. The testing method of claim 15, wherein the stimulation layer is controlled such that the generated stimulus signal is aligned with the at least one activatable element of the GUI.

* * * * *